[11] 3,575,043

| [72] | Inventors | John W. Allen<br>Danbury, Conn.;<br>Leon D. Furon, Woodland Hills, Calif. |
|---|---|---|
| [21] | Appl. No. | 808,012 |
| [22] | Filed | Mar. 17, 1969 |
| [45] | Patented | Apr. 13, 1971 |
| [73] | Assignee | Air Products and Chemicals, Inc.<br>Continuation of application Ser. No.<br>561,435, June 29, 1966, now abandoned. |

[54] ELONGATE ELEMENT ULTRASONIC INSPECTION SYSTEM
15 Claims, 7 Drawing Figs.

[52] U.S. Cl. ................................................ 73/67.8
[51] Int. Cl. ......................................... G01n 29/04
[50] Field of Search ................................... 73/67.5-–67.9, 71.5

[56] References Cited
UNITED STATES PATENTS

| 2,969,671 | 1/1961 | Sproule | 73/67.9 |
| 3,188,859 | 6/1965 | Greenberg et al. | 73/71.5 |
| 3,209,582 | 10/1965 | Greenberg et al. | 73/67.8 |
| 3,413,843 | 12/1968 | Kortenhoven | 73/67.8X |
| 3,455,150 | 7/1969 | Wood | 73/71.5 |

OTHER REFERENCES

Curtiss-Wright Ultrasonic Testing Systems, Curtiss-Wright Corp., 35 Market St. East Paterson, N.J. p 4, 5 & 12. Brochure Pub. 1962.

*Primary Examiner* — Richard C. Queisser
*Assistant Examiner* — John P. Beauchamp
*Attorneys* — Ronald B. Sherer, James C. Simmons and B. Max Klevit

ABSTRACT: Apparatus is described which includes ultrasonic search wheels or the like for ultrasonically scanning a vertical elongated element. The search wheels operate in unison across the workpiece in response to a follower which in turn is mounted to a carriage. The follower is constructed to ride on the top surface of the vertical element. The search wheels are pivotally mounted in such a manner that the ultrasonic energy radiated into the element is always normal to the surface of the element.

Patented April 13, 1971

INVENTORS
JOHN W. ALLEN
LEON D. FURON

BY

ATTORNEY

INVENTORS
JOHN W. ALLEN
LEON D. FURON

BY
ATTORNEY

Patented April 13, 1971

INVENTORS
JOHN W. ALLEN
LEON D. FURON

BY

ATTORNEY

Patented April 13, 1971
3,575,043
4 Sheets-Sheet 4
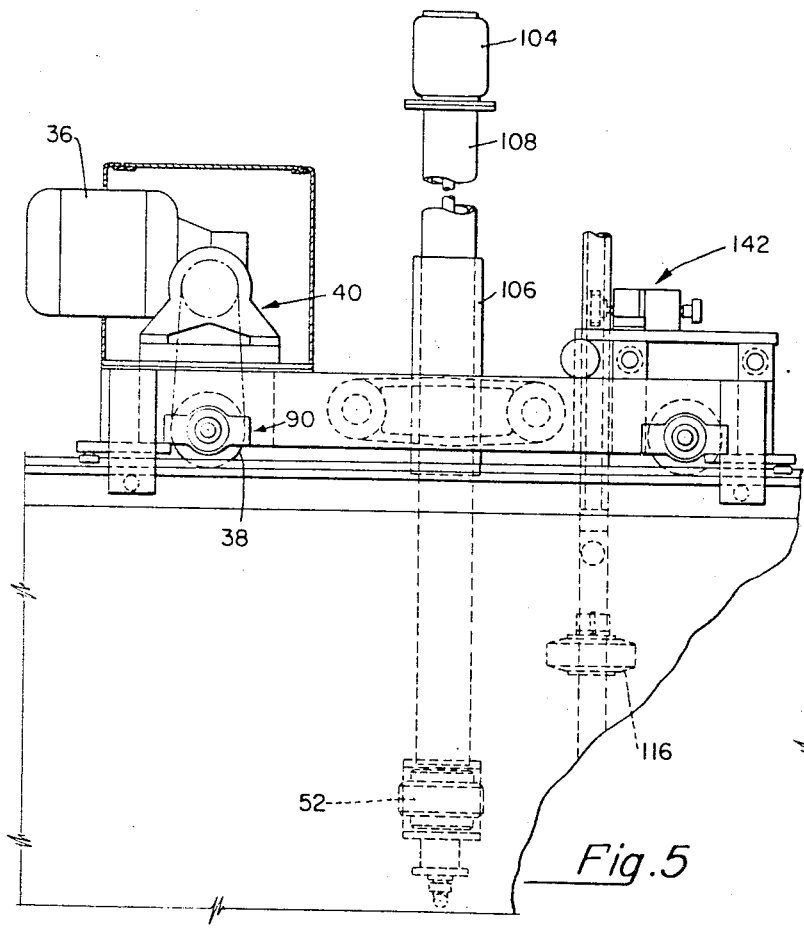
Fig.5
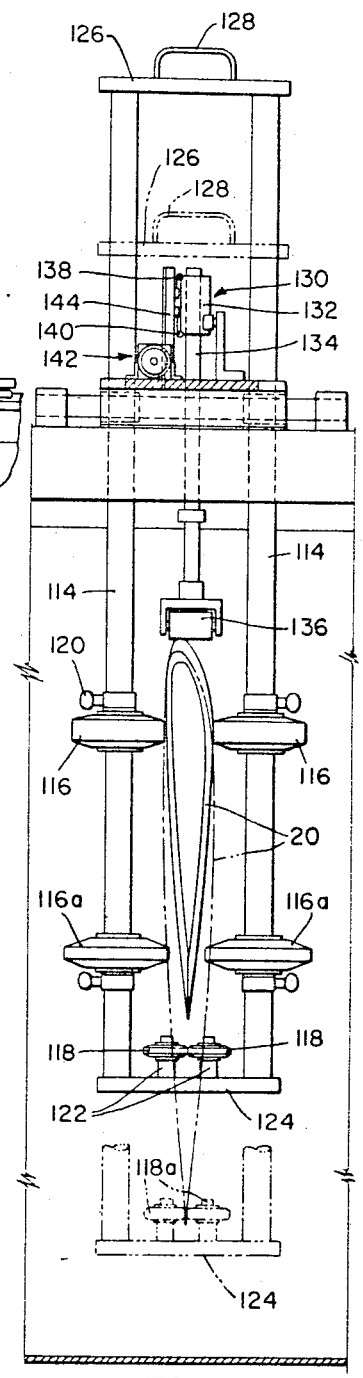
Fig.4
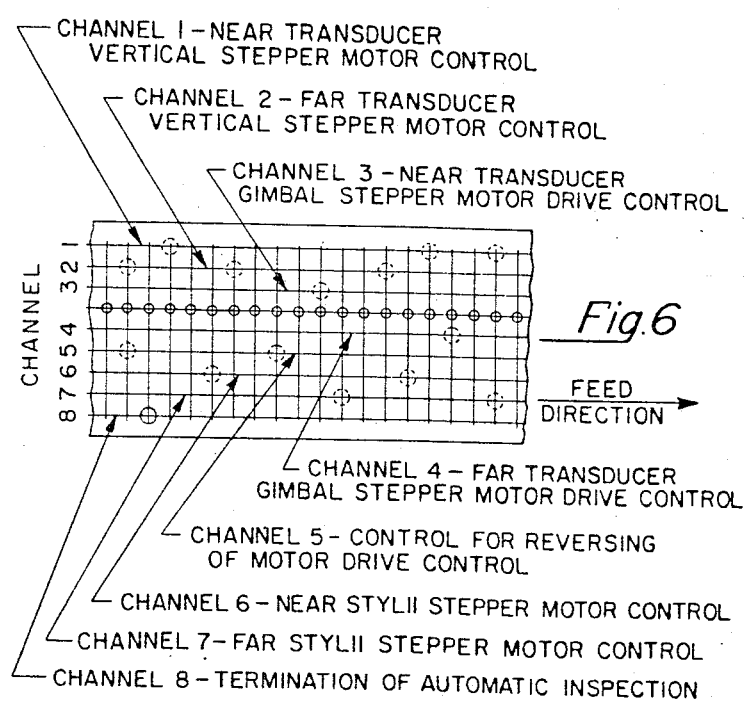
Fig.6
INVENTORS
JOHN W. ALLEN
LEON D. FURON
BY
ATTORNEY

ELONGATE ELEMENT ULTRASONIC INSPECTION SYSTEM

CROSS-REFERENCE TO RELATED CASES

This application is a continuation of copending application Ser. No. 561,435 filed Jun. 29, 1966 on behalf of John W. Allen et al.

The present invention relates generally to an ultrasonic inspection system applicable for automatic ultrasonic inspection of elongate elements particularly adapted for detecting, locating and visibly recording defects in the element or effectiveness of, for example, bonding voids in partially hollow and multiple component assemblies.

More specifically, the present invention is adapted for ultrasonic testing of elongate members having curvilinear surfaces or angularly changing surfaces over at least one of the dimensions thereof which necessitates mechanism for continually or sequentially changing the angular disposition of an ultrasonic transducer member to have the transducer and therefore direction of ultrasonic sound waves emitted thereby normal to that portion of the surface of the element being tested.

For purposes of description of an embodiment of the invention to which it is particularly suitable, there has been chosen, for the purpose of illustration of one application of the invention only, an ultrasonic inspection system for rotary helicopter blades or the like, incorporating wheel-type ultrasonic inspection units on one or both of the surfaces of a blade, and further incorporating means for incrementally and sequentially indexing the position and angular disposition of the scanning wheel so as to operatively ultrasonically test or scan the entire area of a blade to detect flaws therein such, for example, as bonding voids or the like.

SUMMARY OF THE INVENTION

Briefly described, the present invention provides, in a preferred embodiment, a system and apparatus for nondestructive testing of elongated workpieces. Such a workpiece, for example, may be in the form of a helicopter blade. Because some helicopter blades have oval configurations, when viewed in cross section, special attention must be paid to assuring that the transducers in the search units are positionable to transmit ultrasonic energy normal into the workpiece.

The system of this invention provides that the elongated elements are submerged into a test tank comprising a liquid couplant. The elongated element is pivotally mounted so that the surfaces thereof suspend vertically by gravity force. A carriage is provided which is adapted to move along the horizontal plane of the workpiece. Usually these carriages are constructed to span the test tanks and are movable on rollers.

Preferably, a pair of search units is provided for through transmission of the ultrasonic energy whereby one search unit includes a transmit transducer and the other search unit includes a receive transducer. For the described embodiment of this invention, these search units are in the form of contact wheels which are well known to those skilled in the art. These search unit wheels are mounted to the carriage to contact either side of the vertically suspended workpiece. Further, they are mounted in such a manner that they are coupled to the carriage on pivots which assures the normal transmission of ultrasonic energy.

A follower is provided which is adapted to move in contact with the uppermost surface of the workpiece. This follower is further adapted to position the search units a predetermined distance from the top surface of the workpiece. Thus, the top surface of the workpiece position the follower which in turn operates the position of the search units.

A strip of recording medium is disposed along the outside of the test tank and is mounted on a platen which can extend along the entire horizontal length of the test tank. A stylus is positionable into contact with the recording medium and is adapted to transverse along the recording medium with the carriage. Indicia are marked on the recording medium by the stylus in response to return energy from the receive search unit.

The system as shown and described also incorporates the use of a tape-programming assembly to control vertical indexing and gimballing of the wheel scanning units in conjunction with a recorded stylii index and recording of information obtained which will be recorded on full length recorder platens preferably mounted for each side of the blade in order to display bond inspection information at full scale.

As pointed out above, the teachings and techniques of the present invention, as also the basic system, are susceptible of a multiplicity of usage applications, the medium selected for a detailed description of one embodiment of the invention being applied to a rotary wing element which is elongate and which has curvilinear surfaces extending on both sides from the leading to the trailing edge.

It is an object of the present invention to provide an ultrasonic inspection system and mechanism therefor which includes details of design performance and operational requirements for an automatic ultrasonic inspection system of such wings or blades. The system is preferably capable of detecting, locating and recording, at a 1:1 recording ratio bonding voids in the nature of approximately 1/16-inch diameter and larger in wings having relatively substantial width and utilizing an ultrasonic wheel inspection technique. It is also contemplated that the system can be modified so as to include different recording ratios, for example 2:1, to permit a recording of entire blade widths on large width recorder paper for clarity of recognition and determination of location and extent of structural defects.

It is another object of the present invention to provide in such a system transducer wheels for each side of a blade which are individually controlled to permit the inspection of blades having nonsymmetrical cross sections.

An additional object of the present invention is to provide in such a system equipment which is capable of mechanically scanning a complete elongate element in the nature of a rotary wing blade at a relatively large number of lines per inch in an operational minimum of time, including indexing and turnaround time at the end of each scan.

The system as specifically shown and described in the drawings will support and position a rotary wing and transducer assemblies for obtaining an automatic ultrasonic C scan recording of a wing assembly having an aerodynamic shape. The described system provides for the simultaneous pulse echo inspection of the blade assembly from opposite sides, and the system also permits a through-transmission inspection of the blade trailing edge when required.

Preferably, in the described embodiment, a rotary wing is supported in a tank in a vertical position with the trailing edge down, with both blade ends being so supported by bearings as to permit blade rotation about the supporting axis, with the blades being supported by appropriate means. If desired, and as hereinafter described, means can be provided to compensate for vertical sagging of the blade. A bridge assembly is provided which spans the tank width to support carriages located on either side of the blade center. A guide wheel assembly extends so as to restrain the blade trailing edge or so twist the blade as to maintain a constant blade cross-sectional attitude with respect to the bridge assembly regardless of the bridge location along the tank axis, and when utilizing a sag follower automatic repositioning of the ultrasonic wheels during an inspection to compensate for vertical sagging of the blade is incorporated. The bridge assembly is reciprocated parallel to the blade axis. A tape-programmed wheel assembly vertical indexing and gimballing is provided to occur at the scan limits and recorded stylii index is simultaneously and independently tape-controlled so that the stylii, located on both sides of the bridge, will translate the wheel positions. Full length recorder platens are contemplated which are mounted on each side of the tank component to display the bond information at full or other desired scale.

Rapid setup of a system control panel located, for example, at a tank end, is incorporated and motorized axes are capable of either automatic or remote manual control.

Basically, the system to describe and demonstrate a working embodiment of the present invention will include broadly, the following units:

1. A tank assembly of appropriate dimensions with tracks, cable dispenser, rotary wing holding fixture and two recorder platens.
2. Scanning bridge with two carriages, wheel positioning assemblies, and recorder stylus assemblies.
3. Two ultrasonic inspection wheel assemblies.
4. A console containing tape reader, spooler, logic and motor controls, a pulsed ultrasonic testing instrument, designed to investigate metals and other materials in order to disclose the presence, location and sizes of defects or internal discontinuities, two recorder adapters and a line voltage regulator.
5. Two rolls of dry type recording paper of appropriate length and width.

Other and additional advantages and objects of the present invention will be more readily apparent from the following detailed description of embodiments of the invention when taken together with the accompanying drawings in which:

FIG. 4 is a sectional view taken on line 4–4 of FIG. 2 and more clearly showing means for compensating for sag;

FIG. 5 is a fragmentary elevational view taken on line 5–5 of FIG. 2;

FIG. 6 is a fragmentary plan view of a portion of programming control tape used in the present invention to control operation of the various motor control circuits.

Referring now more specifically to the drawings, showing for illustrative purposes only, one construction and use of the present invention, there will be described in detail the individual elements and operation of this system.

Figure 1:
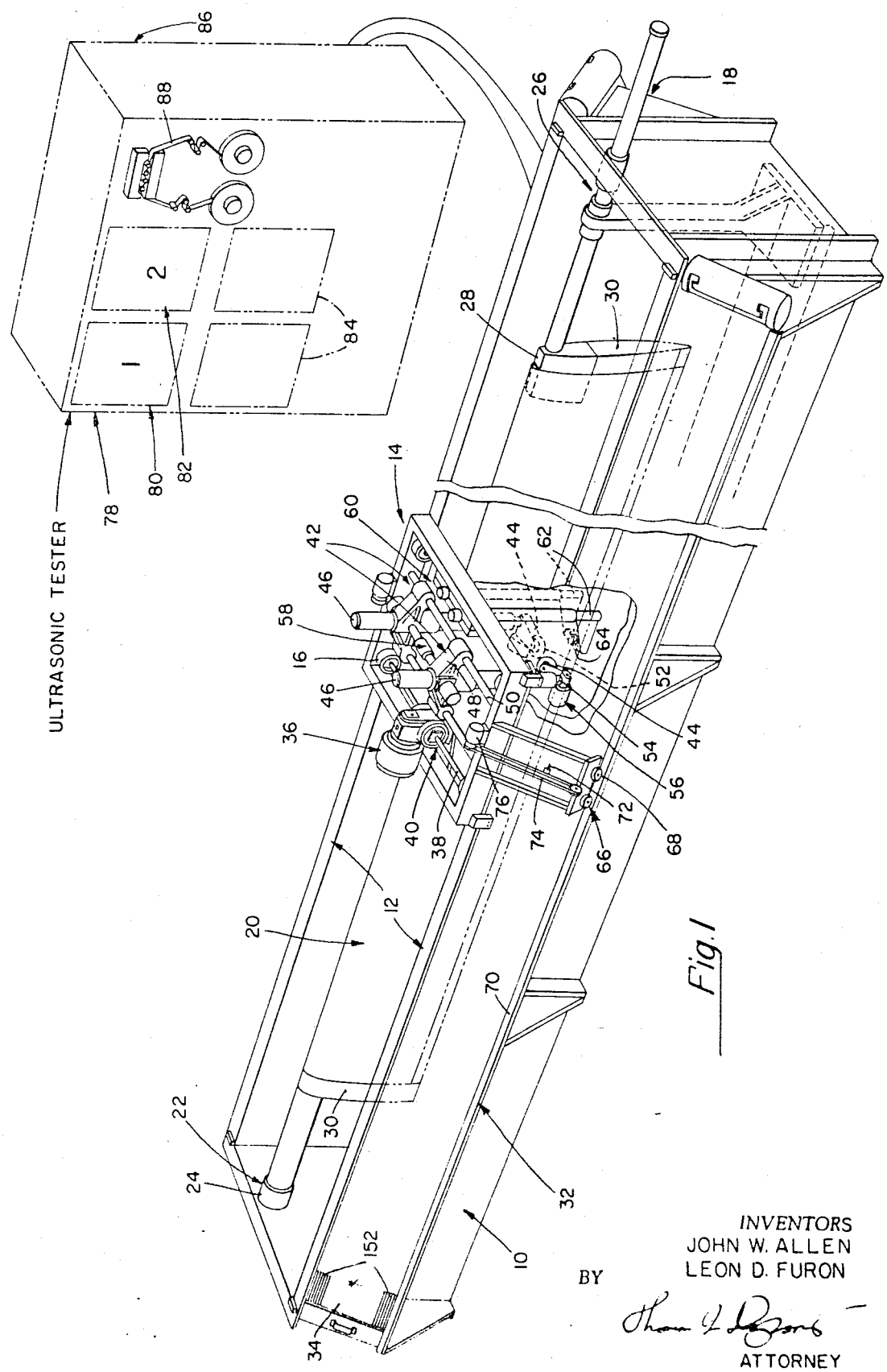
FIG. 1 is a schematic perspective view disclosing the basic arrangement of a system in accordance with the present invention.
Figure 2:
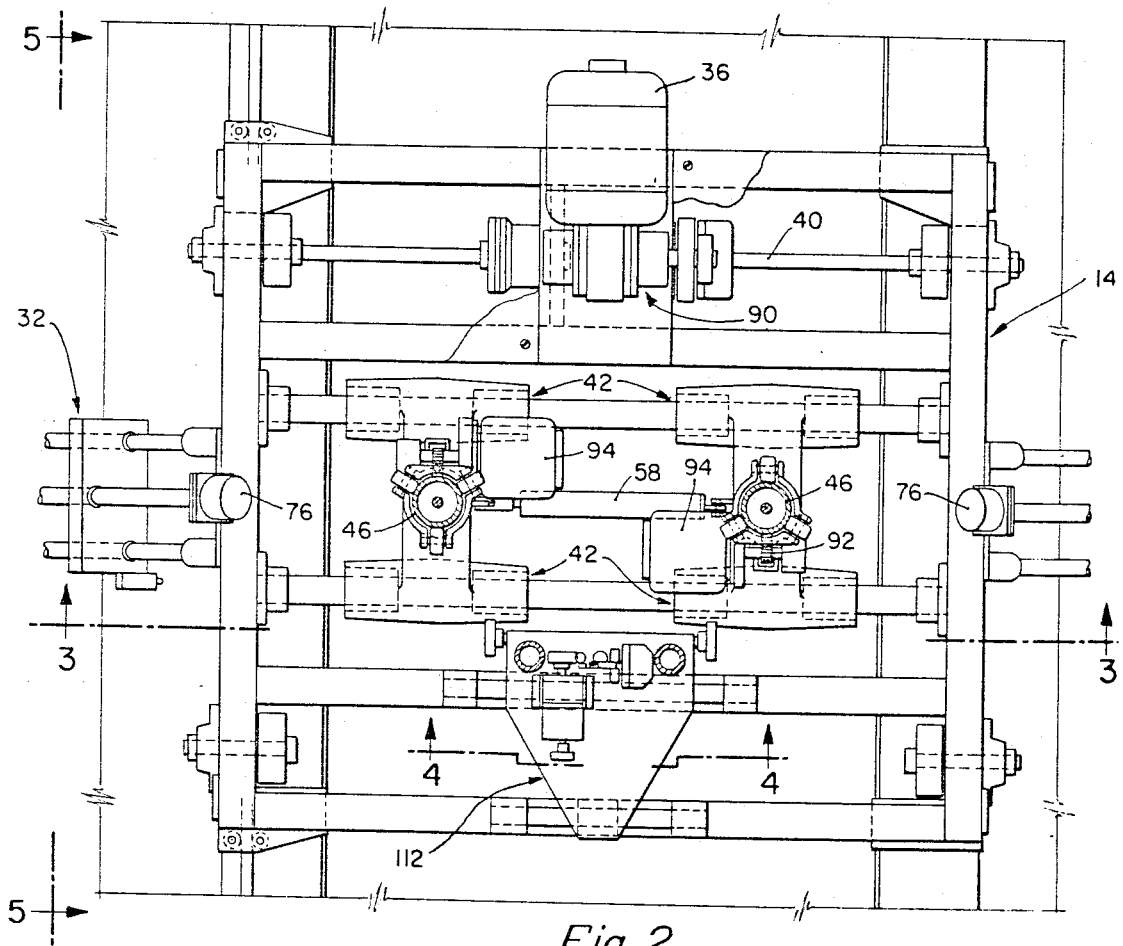
FIG. 2 is a plan view of a carriage assembly adapted for use with the invention to support and control scanning wheel and guide follower rolls for the blade undergoing testing.

The general arrangement of the present system will be more readily apparent from FIG. 1 of the drawings. In this figure a sonic test tank 10 is adapted for mounting on a suitable base and can assume any desired construction providing that it is of suitable dimensions and construction for supporting the element to be tested, and to contain or hold water which might be used in one or more types of testing techniques. Preferably, the tank interior should be so constructed as to be watertight and anticorrosive and have the requisite water fittings, etc. The tank assembly is designed primarily for use as a support structure and drip pan assembly although it can be used as an immersion tank for immersion testing, if so desired, with associated water control mechanisms. Guide tracks 12 are provided on the lateral sides of tank 10 for supporting a scanning bridge, generally designated 14, mounted on rollers 16 to permit traversing of the scanning bridge along the length of the tank.

A support fixture, generally designated 18, is provided in the tank to permit mounting of the test specimen which in the described system is a rotary wing blade 20 which, as well known, has curvilinear aerodynamic surfaces on each side thereof of substantially constantly changing angular disposition with respect to the spar center line. The support fixture includes a headstock assembly 22 fastened to the tank end and includes, for example, a bearing-mounted chuck 24 adapted for clamping to the spar end to permit the blade to be rotated about its axis so that the centerline of the cross section at any station along the blade length can be located in a vertical position. A tailstock assembly 26 is also mounted on the tank adapted to support the blade tip and in conjunction with the headstock permit the blade to be rotated about its axis. An end fixture 28 is incorporated in the tailstock assembly and is adapted to grasp the inside of a D spar of some wing constructions or some other suitable location by means of suitable holding clamps or the like. Blade extension fixtures 30 are needed on each end of the blades to permit transducer wheels and guide wheels utilized in the system to run slightly beyond the blade end to permit an inspection up to the blade end. This can consist of a short blade section or similarly shaped fixture which can easily be attached to the blade end.

A recorder platen assembly, generally designated 32, is mounted on each of the tank sides for testing of each blade side, if desired, and can preferably be mounted at an inclination such as approximately 30° from the vertical so as not to obstruct access to the tank interior. The platen assemblies for one type of blade test can be approximately 2 feet wide, 32 feet long and capable of holding a dry-type recording paper 34, which will be described hereinafter in greater detail, to permit an automatic C scan recording of the bond quality within the wing construction. The dimensions manifestly can be varied depending upon the element to be tested.

The scanning bridge assembly 14 is so designed as to facilitate access to the tank and all system controls. As set forth, the bridge is supported on and adapted to run along guide tracks 12. A bridge scanner drive consists of a suitable motor 36 operatively connected to roller drive shaft 38 through a transmission and gear assembly, generally designated 40, operable to controllably move the scanning bridge assembly along the tank, and therefore the test element, in both directions in accordance with the tape-programmed control therefor. The scanning bridge 14 also supports two carriage, manipulator and wheel assemblies, generally designated 42, with remotely controlled and synchronized mechanisms. This structure includes guide wheel assemblies 44 which include vertically adjustable shafts 46, supported on arms 48, controllably mounted on shafts 50, to control disposition of guide wheels and ultrasonic test wheels 52 at the free ends thereof. The shafts 46 are so constructed as to rotatably journal shafts 54 and serve as gimbal or angularly adjustable supports for the scanning wheels 52, as generally indicated at 56. This structure, as will be described hereinafter, permits not only vertical positioning of the scanning wheels 52 but also serves to control their angular disposition so as to permit adjustment to be normal to the surface of the test element or blade at any point along the chord thereof. A variable force pneumatic tension linkage 58 is provided to hold the two wheel assemblies together to assure that both inspection wheels assert identical forces on opposite sides of the rotary wing assembly.

In the embodiment of FIG. 1 a follower guide assembly 60 is provided, consisting of vertically and movably mounted shafts 62 supporting at the ends thereof follower wheels 64 to facilitate proper holding and positioning of the test element or blade.

A stylus and guide assembly 66 is mounted on each side of the tank and carried by the scanning bridge 14. This assembly includes wheels 68 adapted to run on support tracks 70 of recorder platen assemblies 32. A stylus 72 is carried by a belt 74 which is movably mounted and adjustable through motor 76. It is understood that this mechanism is duplicated on each side of the test assembly and correlated with the position and alignment of the scanning wheels so as to reproduce on the paper 34 a true indication of the presence or lack of defects or flaws in the structure.

The scanning bridge assembly drive preferably should include dynamic braking to terminate scanning motion, and both acceleration and deceleration times should be the same. Right and left scan limit switches are preferably provided to reverse scan direction and are adjustably placed with respect to the tank length for adjustment as required by an operator.

Absolute limit switches, or the like, should also be provided to terminate scanning and the automatic inspection mode should be a maximum safe scan limit be exceeded. The mechanism is operable by means of an automatic vertical manipulator positioning means so that after each bridge scan the scanning wheels are repositioned in such a manner that vertically displaced, horizontal, reciprocated raster scan of the wheel assembly results when the mechanism is properly indexed as controlled by the programmed tape.

All automatic and remote functions are controlled from a remotely located console, generally designated 78, adapted to include two pulsed ultrasonic testing instruments 80 and 82, one for each side of the element being tested and of the nature to investigate the materials under test in order to disclose the presence, location and size of internal discontinuities. Instruments of this nature can consist of Immerscopes, manufactured by The Budd Company and well known in the art. The console also includes two recorder adapter units 84, one for each specimen side, and which are designed to operate with an Immerscope, or the like, to permit producing permanent high quality C scan recordings on facsimile paper. In the system shown in FIG. 1 a linear, black and white, recording is effected although, if desired, the system could be modified to provide halftone information. The Immerscopes have a recorder output sufficient to drive a dry paper recorder for producing black and white C scan recordings and can be adapted, as set forth hereinabove, to produce halftone or gray scale C scan recordings. The recorder adapter is an instrument designed to operate with the sonic (Immerscope) set and provide the necessary facsimile recorder paper recording current required to produce permanent high quality C scan recordings. A recorder adapter of this nature is manufactured by the Budd Company under the trademark SONAFAX, and such instrument is also well known in the art.

A tape and motor control 86 is provided, including an operatively mounted preprogrammed tape 88, to control the various movements of elements of the test mechanism and will be explained in more detail hereinafter with respect to operation of the mechanism.

More specific details of construction and controls will be apparent from a study of FIGS. 2—5 inclusive. The same reference characters utilized generally with respect to FIG. 1 are incorporated herein. For operation of the bridge scanning, the motor 36 is operatively connected to shaft 38 by appropriate transmission and gearing mechanism 40 with a gear and tooth arrangement, or the like, respectively on shaft 38 and mechanism 40, as generally designated at 90, and can be of any appropriate construction. The vertically adjustable shafts 46 can likewise have a cooperating rack and pinion arrangement, generally designated 92, operable by vertical step motors 94 for vertical displacement of the transducer wheels 52 in a step-by-step movement downward along the face of the blade. The gimballing arrangement for the wheels 52 includes a segment worm 96 attached on supporting shaft 98, cooperating with gear worm 100 on shaft 102 which is movable by means of gimbal stepper, motor and drive mechanism 104 so that, as the transducer wheel is stepped vertically downward, the preprogrammed tape 88 controls operation of motor drive mechanism 104 to adjust the angular disposition of the transducer wheels 52 so as to be normal to the surface of the blade for any given vertical displacement of the wheels. This vertical displacement and angular adjustment is more clearly indicated at different operating positions 52a and 52b in FIG. 3, in broken lines. It will be seen that a complex positioning of the transducer wheels occurs as the testing progresses. The stylii motors 76 are also operable to incrementally, step-by-step, displace the stylus 76 as the transducer wheel is vertically moved over the surface of the test element or blade 20.

Figure 3:
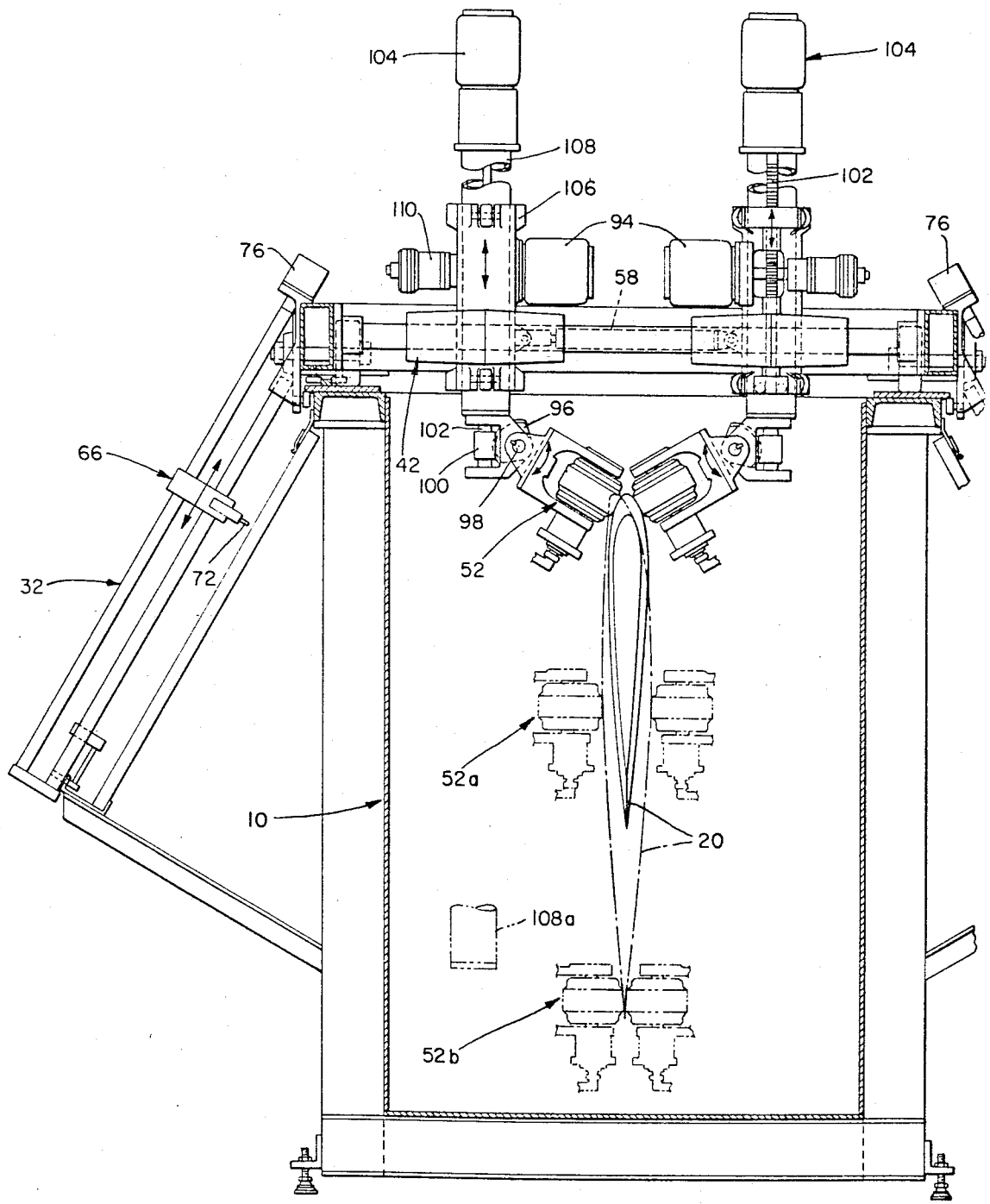
FIG. 3 is a sectional view taken on line 3–3 of FIG. 2 showing a portion of the mechanism suitable for use without a droop snoot blade construction.

For purposes of vertical stepping, positioning and stopping of the ultrasonic transducer wheels, there is also incorporated in the drive structure a carriage casting 106 through which search tube 108 extends, and operable to a position indicated at 108a in broken lines, and shaft 102 as shown in FIG. 3, extends therethrough. A brake 110 is provided for stop motion of the vertical adjust and/or gimbal adjusting mechanism.

As shown in FIG. 3, the blade can have different dimensions, and angle of attack through its length can vary. Different blades likewise will have different dimensional proportions etc., and the present invention is adapted to accommodate such variations by means of preprogramming of the tape for control of the various motor drives, etc.

FIG. 3 shows a construction adapted for use for a blade without a droop snoot, although the mechanism shown in FIGS. 2—5 is adaptable for use with a blade having a droop snoot, as will appear from the following.

A guide roller and sag follower mechanism 112 is mounted on the carriage and includes vertical shafts 114 on either side of the blade on which wheels 116 and 118, of different diameters, are adjustably carried and can be fixed by means of set screws 120, or the like. The purpose of these wheels and the difference in diameters thereof is to captivate a blade being tested by contact with the outer surfaces thereof, and serve to hold the blade perpendicular at the point of inspection by the ultrasonic scanning wheel.

As shown in FIG. 4 of the drawings, wheel sets 116, 118 and 116a, 118a comprise different sets, which are utilized in accordance with the size or dimensions of the blades being tested. The wheels 118 are carried on stub shafts 122 on a base plate 124 rather than being slidably mounted on the shafts 114, but the shafts 114 are as a unit adjustable vertically through the medium of an interconnecting upper plate 126 and operating member 128. The sag follower assembly is generally indicated at 130 and includes a block 132, operatively mounted on shaft 134, which at its lower end carries a follower roller 136, adapted to be maintained in contact with the leading edge of the wing blade, and to thereby raise or lower the block 132 depending upon the leading edge of the blade. Upper and lower limit switches 138, 140 respectively, are mounted adjacent the block 132, which are operatively connected in circuit with the stepper motors for controlling the operation thereof. The sag follower is designed to automatically reposition the ultrasonic wheels during an inspection for any vertical sagging of the helicopter blade. This is accomplished in the following manner.

Roller 136 rides on the leading edge of the blade, transmitting any vertical displacement to block 132 attached to the shaft 134 which serves as the roller mount. Any vertical displacement of block 132 will trip limit switch 140 or 138, depending on the direction of movement. The tripping of either limit switch will automatically turn on a stepper motor 142, which will in turn drive the block 144, containing the limit switches, until the limit switches are both off. At the same time the two vertical drive stepper motors controlling the vertical position of the ultrasonic wheels will be driven in the same direction and therefore maintain the correct inspection position on the helicopter blade.

It will thus be seen that the ultrasonic wheels are positioned normal to the surface of the blade, and their position along the surface of the air foil is synchronized with the developed surface on the recorder by means of the stepper motors, which are pulsed with the appropriate number of pulses as contained on the control tape.

FIG. 6 shows a fragment of the programming tape 88 of FIG. 1 adapted for coaction with the tape and motor control unit 86. The tape has a plurality of tape channels, eight in number in the present instance, and which eight tape channels are so punched and operable to translate control pulses to the various stepper motors and control circuitries. The eight tape channels are utilized for the following functions:

1. Controlling the near wheel vertical position.
2. Controlling the far wheel vertical position.
3. Controlling the near wheel gimbal.
4. Controlling the far wheel gimbal.
5. Setting the gimbal direction of either wheel automatically.
6. Controlling the near stylii position.
7. Controlling the far stylii position.

8. Terminating the automatic inspection mode.

This tape in conjunction with mechanism in the console including the tape reader, tape spooler, logic and stepper motor control circuit, line voltage regulator and the recorder adapters, will thereby control the operation and functioning of the test equipment depending upon the information contained on the preprogrammed tape. The various individual controls, and their usages, have been set forth hereinabove and each time a hole occurs in a particular channel this will cause the motor control circuits to step a particular stepper motor one step, to thereby ultimately scan the entire blade and feed the necessary information to the stylii, which in turn translate the material in a readily visible manner, correlated with the transducer wheel position, to positively indicate presence or lack of flaws, and in the particular embodiment described lack of or poor bonding of surfaces within the blade structure.

Figure 7:
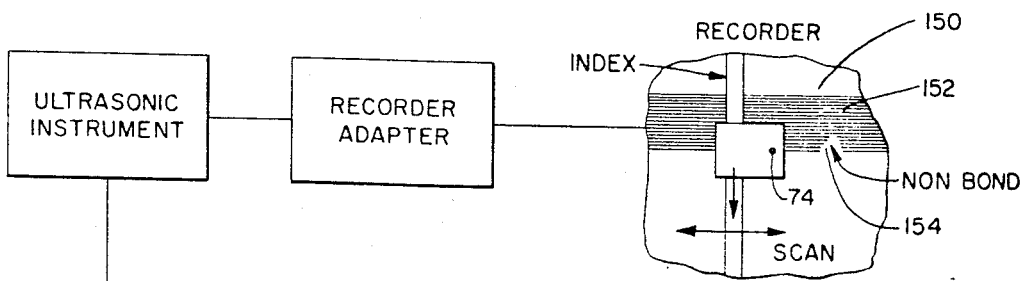
FIG. 7 is a schematic, partially graphic, view of the control system of the present invention.
Figure 7:
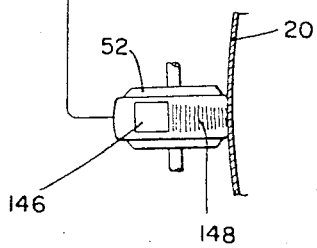

A schematic of the overall system is shown in FIG. 7, including a blade or wing portion being tested 20, on which rides ultrasonic test wheel 52 of a known construction which can carry an ultrasonic transducer 146, adapted to emit and receive ultrasonic waves in a sound wave beam designated 148, which serve the function of initiating and receiving flaw detection information from the blade. The wheel can comprise a liquid containing wheel, and a transducer couplant can be utilized between the wheel and the blade during tests, other than immersion tests. If desired, the transducer arrangement can be such that the transducer per se can be exterior of the wheel, and a deflector can be mounted within the wheel to direct and receive the sound wave pulses. The triggering and receiving mechanism for electrical impulses to and from the transducer is the ultrasonic instrument or Immerscope referred to hereinabove, which is interconnected with the recorder adapter which controls the ultrasonic instrument to transcribe derived information therefrom so as to drive, control and operate the stylus assembly in such a manner as to visually indicate a C scan reading on the recorder paper, by a plurality of stepped lines 150, as the transducer wheel is vertically indexed, and longitudinally scans the blade with appropriate correction of the gimballing mechanism. In the absence of flaws, such as lack of bond, the lines will be continuous as indicated in the region 152 on the recorder paper, whereas when a flaw, such as lack of bond, occurs in the blade, the stylus will not record on the paper, and this area can readily be correlated with the area of the blade under test to point out the exact position of the flaw and the extent thereof.

The system as shown and described is particularly applicable to blades or elements of constant cross section. By addition of further controls in an obvious manner it is possible to compensate for constantly changing cross sections.

From the foregoing description and attached drawings the construction and operation of the present invention will be readily apparent to those skilled in the art. Manifestly, minor changes in construction and operation can be effected in the invention without departing from the spirit and scope thereof, as defined in and limited solely by the appended claims.

We claim:

1. In a system for ultrasonic flaw detection in an elongated element having a first axis along the elongated plane and a second axis across the elongated plane and nonplanar surfaces said element being pivotally mounted on the first axis to be horizontally disposed and to be suspended whereby the second axis is vertically disposed;

an ultrasonic transducer;

longitudinal translation means for moving said ultrasonic transducer over the surface and along the first axis of said element for ultrasonic scanning thereof, said ultrasonic transducer being adapted to transmit into and receive from said element ultrasonic signals, the received signals reflecting the presence and absence of flaws in said element;

means mounting said transducer for causing movement along the second axis thereof to incrementally step over the face of said element along the second axis thereof following each longitudinal scanning movement;

angular mounting means operatively mounting said transducer for angularly adjusting the effective ultrasonic face of said transducer for positioning the face normal to the surface of the element being tested for each incremental transversely moved position thereof;

means for angularly adjusting said angular mounting means and for controlling said adjustment in synchronism with the movement along the second axis;

preprogrammed control means for controlling said longitudinal translation along the first axis and said incrementing means for said transverse movement along the second axis; and display means operable for visually presenting detected flaws with respect to position and magnitude in said element.

2. In a system as claimed in claim 1, sag follower means adapted for continuous running contact with an edge surface of the element being tested, and means operable by said follower means to adjust the transverse position of said transducer at any position along the second axis during longitudinal translation thereof in the first axis to accurately position said transducer with respect to said element for proper ultrasonic testing of the entire surface of the element.

3. In a system as claimed in claim 2, positioning wheels mounted adjacent opposed transverse faces of the element and adapted to fixedly position the element in a plane normal to the effective emitting surface of said transducer.

4. In a system as claimed in claim 3, said wheels being in sets and being adjustably mounted for conformity with elements of different sizes and shapes.

5. In a system as claimed in claim 4, means for operating said transducer to emit ultrasonic pulses therefrom and receive reflected ultrasonic impulses from the element being tested, and said display translating said received impulses into a visual recording, indicating the presence or lack of flaws in the element being tested.

6. In a system as claimed in claim 5, said visual display means including:

a strip of paper of equal length with the element being tested; and indicating means coacting with the surface of said strip to visually trace longitudinal scan lines therealong corresponding to the longitudinal and transverse translation of the transducer over the surface of the element being tested such that lack of flaws presents a continuous trace indication, and presence of a flaw results in lack of a trace indication on said strip, the absence of an indication corresponding with the position and extent of a flaw in the element being tested.

7. In a system as claimed in claim 6, said preprogramming control means comprising a tape having a plurality of program channels thereon, means on each of said channels operable to control each of the controllable means and additionally to stop said longitudinal translation at ends of the element being tested and incrementally adjust the transducer for a succeeding longitudinal transverse movement and to stop testing operating at the end of a test.

8. In a system as claimed in claim 7, said transducer comprising a transducer wheel, and a said transducer wheel being mounted adjacent each transverse face of said element.

9. A system for ultrasonic flaw detection in an elongated element having a first axis along the elongated plane, a second axis across the elongated plane and nonplanar surfaces comprising:

element support means for pivotally mounting said element on the first axis so that the second axis suspends in a vertical position;

at least one movably mounted ultrasonic transducer operatively associated with a surface of said elongate element;

means for translating said transducer along the first axis of said element;

means for incrementally stepping said transducer along the second axis in fixed increments at the end of longitudinal translation movements for subsequent reverse movement of said transducer to ultimately pass said transducer over substantially the entire surface of said element;

means for angularly adjusting the effective sound emitting surface of said transducer as required for each longitudinal translation thereof to be substantially normal to the surface being tested;

means for transmitting electrical impulses into, and reception of ultrasonic impulses from, said transducer and means for transcribing said received impulses in a continuous visual recording indicating defects or flaws in the element structure, in correlation with the position of said transducer with respect to said element.

10. A system for testing an elongated element having a first axis along the elongated plane and a second axis across the elongated plane, said system comprising:

a support, the elongated element being pivotally mounted to said support on the first axis whereby the first axis being horizontally disposed whereby the second axis suspends in a vertical position;

a carriage, said carriage being mounted to said support and being adapted to travel back and forth along the first axis of the element;

a follower adapted to ride in engagement with the top surface of the elongated element, said follower being slidably mounted to said carriage;

at least one ultrasonic transducer being operable by said follower whereby said transducer remains a proportioned distance from the top surface of said element during the traveling of said carriage, said transducer being adapted to be positioned into acoustical communication with the vertical sides of the elongated element, said transducer being pivotally mounted to radiate ultrasonic energy into the surface of the element in a direction normal to the surface of the sides thereof; and means for incrementing said transducer in a direction transverse to the direction of travel at predetermined intervals.

11. The system as defined in claim 10, and further comprising a visual display means responsive to said transducer for providing visual indications of the return energy to said transducer.

12. The system as defined in claim 10, and further comprising:

a strip of recording medium disposed along the length of travel of said carriage along said support; and a stylus being positionable into contact with said medium and adapted to transverse said medium with said carriage and being adapted to mark indicias on said medium in response to return energy from said transducer.

13. In a system for flaw detection in an elongated element or plate, said element or plate having a first axis and a second axis:

means for pivotally mounting said element or plate on the first axis to be horizontally disposed and whereby said element or plate is suspended whereby said second axis is vertically disposed;

a search unit being adapted to be in communication with at least one surface of said element or plate for flaw detection purposes;

means for causing said search unit to scan said element or plate in a predetermined scan pattern;

means disposed in communication with the top surface of the vertically disposed element or plate for sensing the position of the top surface of said element or plate; and vertically adjustable support means supporting said search unit and being responsive to said position sensing means for assuring a uniform scan distance between said top surface and said search unit during the scanning thereof.

14. In the system as defined in claim 13 wherein said search unit including an ultrasonic transducer being adapted to radiate ultrasonic energy into said element or plate and to receive ultrasonic energy therefrom.

15. In a system for flaw detection in an elongated element or plate:

means for vertically disposing said element or plate during flaw detection therein;

a search unit being adapted to be in communication with at least one vertical surface thereof;

means for causing said search unit to scan said element or plate in a predetermined scan pattern;

means disposed in communication with the top surface of the vertically disposed element or plate for sensing the position of the top surface of said element or plate; and vertically adjustable support means supporting said search unit and being responsive to said position sensing means for assuring a uniform scan distance between said top surface and said search unit during the scanning thereof.